(12) United States Patent
Stadnyk

(10) Patent No.: US 7,832,783 B1
(45) Date of Patent: Nov. 16, 2010

(54) MOTORCYCLE SECONDARY WINDSHIELD MOUNT SYSTEM

(76) Inventor: Mark Stadnyk, 5312 Azalea Cir., Ridge Manor, FL (US) 33523

( * ) Notice: Subject to any disclaimer, the term of this patent is extended or adjusted under 35 U.S.C. 154(b) by 177 days.

(21) Appl. No.: 12/315,051

(22) Filed: Nov. 26, 2008

Related U.S. Application Data

(63) Continuation-in-part of application No. 11/591,268, filed on Oct. 31, 2006, now Pat. No. 7,458,626.

(51) Int. Cl.
*B62J 17/04* (2006.01)
(52) U.S. Cl. .................................................... 296/78.1
(58) Field of Classification Search ............... 49/248, 49/249; 296/77.1, 78.1, 84.1, 89, 91, 96.14, 296/96.2, 180.1, 180.5
See application file for complete search history.

(56) References Cited

U.S. PATENT DOCUMENTS

| | | | | |
|---|---|---|---|---|
| 3,369,836 A * | 2/1968 | Haycock et al. | ............ | 296/78.1 |
| 4,309,056 A * | 1/1982 | Long | ............. | 296/91 |
| 4,355,838 A * | 10/1982 | Hickman | .................. | 296/78.1 |
| 4,479,663 A * | 10/1984 | Morris et al. | ............... | 296/78.1 |
| 4,696,509 A * | 9/1987 | Yagasaki et al. | ......... | 296/96.21 |
| 4,707,017 A | 11/1987 | Minobe | | |
| 4,830,423 A * | 5/1989 | Nebu et al. | ................. | 296/78.1 |
| 4,982,923 A * | 1/1991 | Wanner | .................... | 248/286.1 |
| 5,730,483 A | 3/1998 | Greger | | |
| 5,732,965 A * | 3/1998 | Willey | ..................... | 280/288.4 |
| 5,788,313 A * | 8/1998 | Willey | ..................... | 296/78.1 |
| 5,845,955 A * | 12/1998 | Willey | ..................... | 296/78.1 |
| 5,855,404 A * | 1/1999 | Saunders | .................... | 296/78.1 |
| 6,273,382 B1 * | 8/2001 | Pemberton | ............... | 248/286.1 |
| 6,293,606 B1 * | 9/2001 | Jarosz et al. | ................ | 296/78.1 |
| 6,679,537 B1 * | 1/2004 | Putnam, Jr. | ................. | 296/78.1 |
| 6,709,042 B2 * | 3/2004 | Takemura et al. | ........... | 296/78.1 |
| 6,877,788 B2 * | 4/2005 | Graham | ..................... | 296/78.1 |
| 6,905,160 B2 * | 6/2005 | Yoshida et al. | ............. | 296/78.1 |
| 6,948,757 B2 | 9/2005 | Wegener | | |
| 6,974,175 B2 * | 12/2005 | Willey | ........................ | 296/78.1 |
| 6,983,973 B2 * | 1/2006 | Suzuki | ....................... | 296/78.1 |
| 7,000,971 B2 | 2/2006 | Wegener | | |
| 7,281,750 B1 * | 10/2007 | Wise | ........................... | 296/78.1 |
| 7,347,485 B1 * | 3/2008 | Saunders | .................. | 296/180.5 |
| 2005/0140162 A1 * | 6/2005 | Yamasaki | .................... | 296/78.1 |

(Continued)

FOREIGN PATENT DOCUMENTS

DE 3609595 A1 * 9/1987

(Continued)

*Primary Examiner*—Glenn Dayoan
*Assistant Examiner*—Paul A Chenevert

(57) ABSTRACT

A secondary windshield has upper and lower surfaces, a top, a bottom and opposite sides. Each pair of two pair of brackets has a bottom and a top bracket. Each bottom bracket has upper and lower slots alignable with a plane of a primary windshield. Each top bracket has a first section positioned in contact with the secondary windshield and a second section transverse to the first section. Each pair of brackets has upper and lower legs. Each upper leg has a lower end slidable and pivotable within the upper slot and an upper end pivotable in the second section adjacent the top of the secondary windshield. Each lower leg has a lower end slidable and pivotable within the lower slot. Each lower leg has an upper end pivotable in the second section adjacent the bottom of the secondary windshield.

5 Claims, 8 Drawing Sheets

U.S. PATENT DOCUMENTS

| | | | |
|---|---|---|---|
| 2009/0189413 A1 * | 7/2009 | Misaki et al. | 296/180.1 |
| 2009/0195011 A1 * | 8/2009 | Tsuda et al. | 296/78.1 |

FOREIGN PATENT DOCUMENTS

| DE | 3941875 A1 * | 6/1991 |
|---|---|---|
| JP | 03061192 A * | 3/1991 |
| JP | 03065483 A * | 3/1991 |
| JP | 05254470 A * | 10/1993 |
| JP | 2000159173 A * | 6/2000 |
| JP | 2002087355 A * | 3/2002 |
| JP | 2006051843 A * | 2/2006 |
| JP | 2006082810 A * | 3/2006 |
| JP | 2006096294 A * | 4/2006 |
| JP | 2007045283 A * | 2/2007 |

* cited by examiner

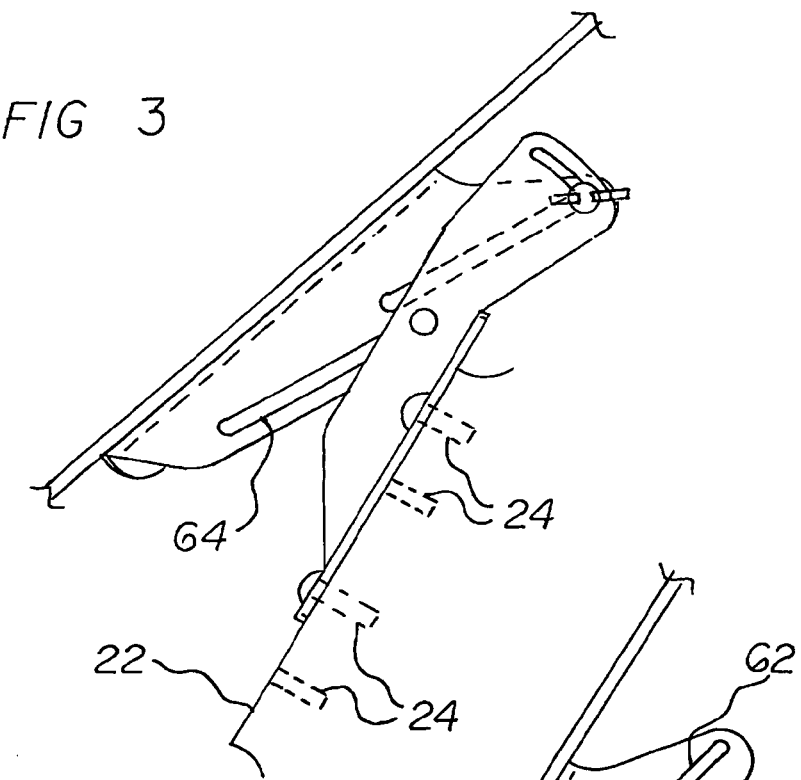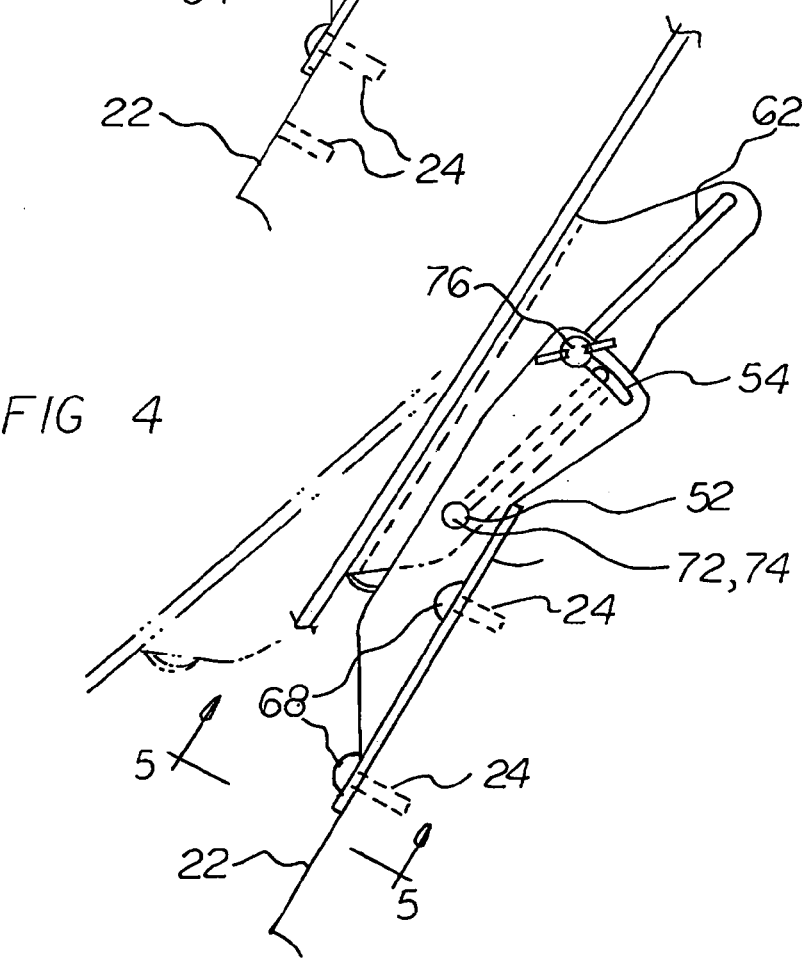

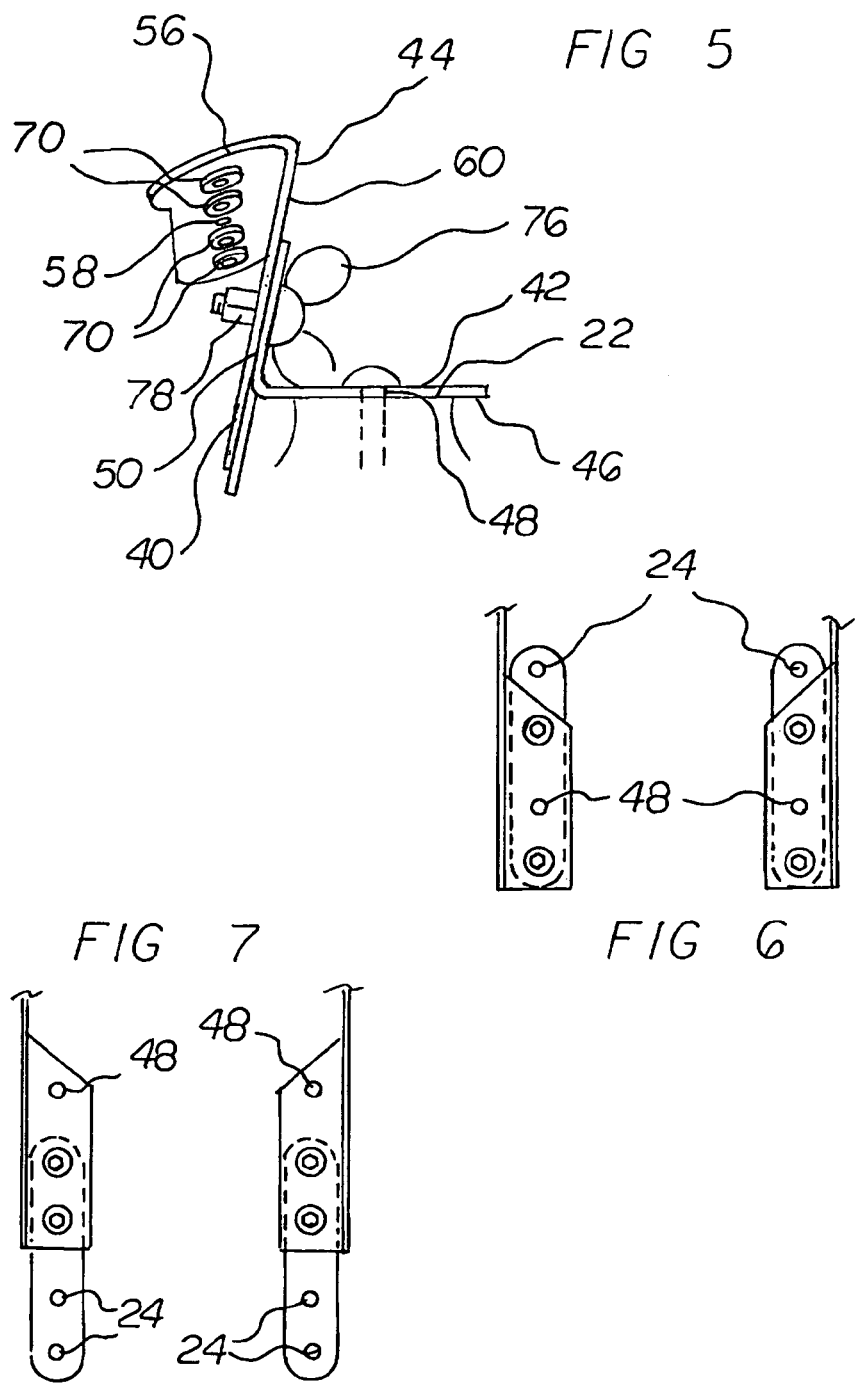

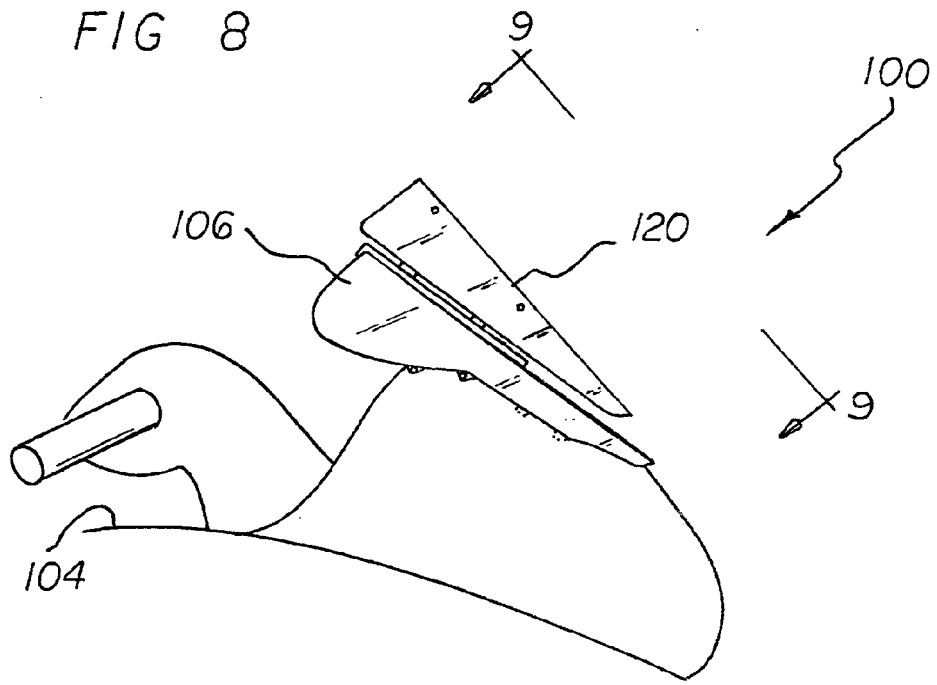
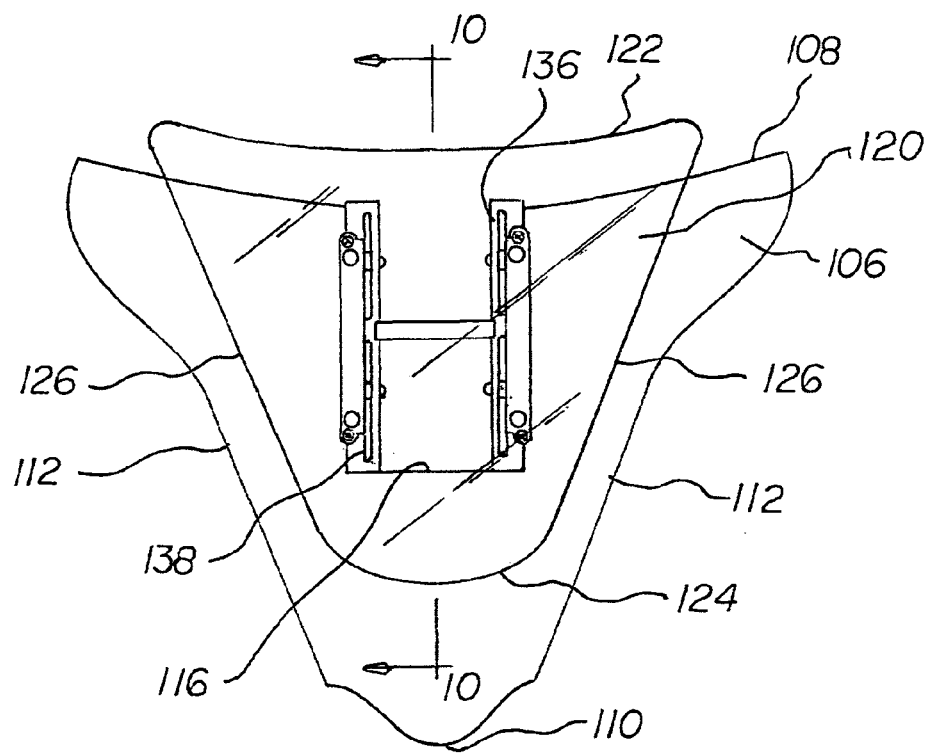

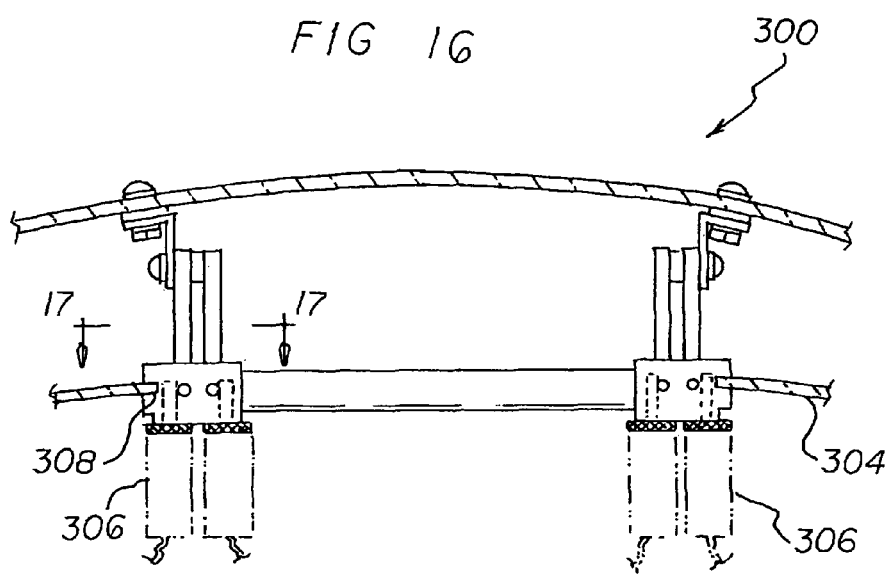
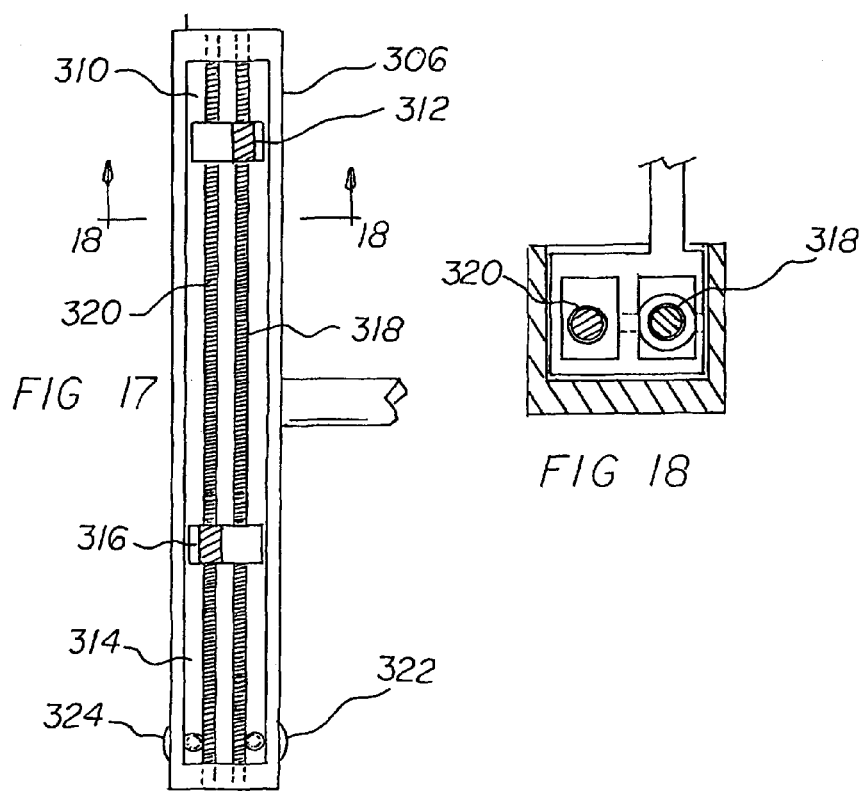

MOTORCYCLE SECONDARY WINDSHIELD MOUNT SYSTEM

RELATED APPLICATION

This application is a continuation-in-part of U.S. patent application Ser. No. 11/591,268 filed Oct. 31, 2006, issuing as U.S. Pat. No. 7,458,626 on Dec. 2, 2008.

BACKGROUND OF THE INVENTION

1. Field of the Invention

The present invention relates to a motorcycle secondary windshield system and more particularly pertains to independently and infinitely adjusting the height and angle and separation of a secondary windshield with respect to a primary windshield of a motorcycle.

2. Description of the Prior Art

The use of windshield mounts of known designs and configurations is known in the prior art. More specifically, windshield mounts of known designs and configurations previously devised and utilized for the purpose of adjusting a windshield through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,707,017 issued Nov. 17, 1987 to Minobe relates to an Adjustable Height Windshield Apparatus for Motorcycles. U.S. Pat. No. 5,730,483 issued Mar. 24, 1998 to Greger relates to a System for Adjusting a Windshield for Vehicles. U.S. Pat. No. 6,948,757 issued Sep. 27, 2005 to Wegener relates to a Wind Shield for Motorbikes and Drive Device for a Vehicle Component. Lastly, U.S. Pat. No. 7,000,971 issued Feb. 21, 2006 to Wegener relates to a Windshield for Motorcycles and Drive Means for a Motor Vehicle Component.

While these devices fulfill their respective, particular objectives and requirements, the aforementioned patents do not describe a motorcycle secondary windshield system that allows independently and infinitely adjusting the height and angle and separation of a secondary windshield with respect to a primary windshield of a motorcycle.

In this respect, the motorcycle secondary windshield system according to the present invention substantially departs from the conventional concepts and designs of the prior art, and in doing so provides an apparatus primarily developed for the purpose of independently and infinitely adjusting the height and angle and separation of a secondary windshield with respect to a primary windshield of a motorcycle.

Therefore, it can be appreciated that there exists a continuing need for a new and improved motorcycle secondary windshield system which can be used for independently and infinitely adjusting the height and angle and separation of a secondary windshield with respect to a primary windshield of a motorcycle. In this regard, the present invention substantially fulfills this need.

SUMMARY OF THE INVENTION

In view of the foregoing disadvantages inherent in the known types of windshield mounts of known designs and configurations now present in the prior art, the present invention provides an improved motorcycle secondary windshield system. As such, the general purpose of the present invention, which will be described subsequently in greater detail, is to provide a new and improved motorcycle secondary windshield system and method which has all the advantages of the prior art and none of the disadvantages.

To attain this, the present invention essentially comprises a motorcycle secondary windshield mount system shown in FIGS. 8 through 18. The system is for independently and infinitely adjusting the height and angle and separation of a secondary windshield with respect to a primary windshield of a motorcycle. First provided in the system is a motorcycle. The motorcycle has a primary windshield with upper and lower surfaces. The primary windshield has a top and a bottom and tapering opposite sides. The distance between the opposite sides is greater adjacent to the top than the bottom. A rectangular cutout in the primary windshield extends downwardly from the top to form parallel side edges of a length defining a height and a transverse lower edge of a length defining a width.

Next provided is a secondary windshield having upper and lower surfaces and having a top and a bottom and tapering opposite sides. The distance between the opposite sides of the secondary windshield is greater adjacent to the top than the bottom. The distance between the opposite sides of the secondary windshield is greater than the width of the cutout but less than the width of the primary windshield. The distance between the top and bottom of the secondary windshield is greater than the height of the cutout but less than the height of the primary windshield. The windshields are fabricated of an essentially rigid, transparent material.

Next provided are two pair of brackets, a bottom bracket and a top bracket in each pair. Each bottom bracket has a recess to receive an associated side edge of the cutout. Each bottom bracket has upper and lower slots aligned with a plane of the primary windshield. Each top bracket has a first section positioned in contact with the secondary windshield. Each top bracket has a second section transverse to the first section. Each pair of brackets has an upper leg and a lower leg. Each upper leg has a lower end slidable and pivotable within the upper slot. Each upper leg has an upper end pivotable in the second section adjacent the top of the secondary windshield. Each lower leg has a lower end slidable and pivotable within the lower slot. Each lower leg has an upper end pivotable in the second section adjacent the bottom of the secondary windshield. A cross piece couples the brackets to secure the brackets in position within the cutout. Adjustment screws are provided for positioning the legs in an intended orientation. The angle between the legs and the primary windshield determines the separation between the windshields. The spacing between the adjustment screws determines the angle between the windshields. The location of the adjustment screws along the slots determines the height of the secondary windshield.

Lastly, bolts are provided which extend through the first section of each top bracket and the secondary windshield for coupling the top brackets to the secondary windshield. Set screws through each bottom bracket are for coupling the bottom brackets to the primary windshield.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle secondary windshield system which has all of the advantages of the prior art windshield mounts of known designs and configurations and none of the disadvantages.

It is another object of the present invention to provide a new and improved motorcycle secondary windshield system which may be easily and efficiently manufactured and marketed.

It is further object of the present invention to provide a new and improved motorcycle secondary windshield system which is of durable and reliable constructions.

An even further object of the present invention is to provide a new and improved motorcycle secondary windshield system which is susceptible of a low cost of manufacture with regard to both materials and labor, and which accordingly is then susceptible of low prices of sale to the consuming public, thereby making such motorcycle secondary windshield system economically available to the buying public.

Even still another object of the present invention is to provide a motorcycle secondary windshield system for independently and infinitely adjusting the height and angle of a windshield with respect to a motorcycle, such adjusting being done separately or simultaneously.

Lastly, it is an object of the present invention to provide a new and improved motorcycle secondary windshield mount system, wherein a secondary windshield has upper and lower surfaces, a top, a bottom and opposite sides. Each pair of two pair of brackets has a bottom and a top bracket. Each bottom bracket has upper and lower slots alignable with a plane of a primary windshield. Each top bracket has a first section positioned in contact with the secondary windshield and a second section transverse to the first section. Each pair of brackets has upper and lower legs. Each upper leg has a lower end slidable and pivotable within the upper slot and an upper end pivotable in the second section adjacent the top of the secondary windshield. Each lower leg has a lower end slidable and pivotable within the lower slot. Each lower leg has an upper end pivotable in the second section adjacent the bottom of the secondary windshield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view of the motorcycle windshield mount system taken at line 3-3 of FIG. 2.

FIG. 4 is a cross sectional view of the motorcycle windshield mount system similar to FIG. 3 but illustrating the windshield in a different orientation.

FIG. 5 is a cross sectional view of the motorcycle windshield mount system taken at line 5-5 of FIG. 4.

FIG. 6 is a plan view of the bottom brackets coupled to the motorcycle in a retracted orientation.

FIG. 7 is a plan view of the bottom brackets coupled to the motorcycle in an advanced orientation.

FIG. 8 is a side elevational view of a windshield mount system constructed in accordance with the principles of the present invention.

FIG. 9 is a plan view of the system taken along line 9-9 of FIG. 8.

FIG. 16 is a cross sectional view similar to FIGS. 12 and 14 but illustrating another alternate embodiment.

FIG. 17 is a cross sectional view taken along line 17-17 of FIG. 16.

FIG. 18 is a cross sectional view taken along line 18-18 of FIG. 17.

The same reference numerals refer to the same parts throughout the various Figures.

DESCRIPTION OF THE PREFERRED EMBODIMENT

Figure 1:
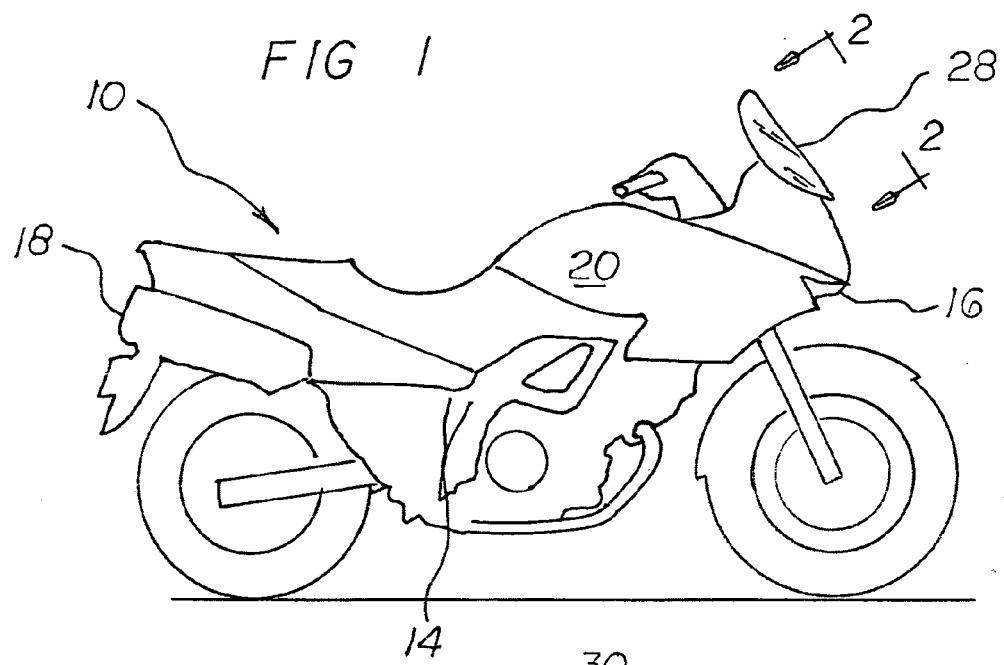
FIG. 1 is a side elevational view of a motorcycle and motorcycle windshield mount system constructed in accordance with the principles of the present invention.
Figure 2:
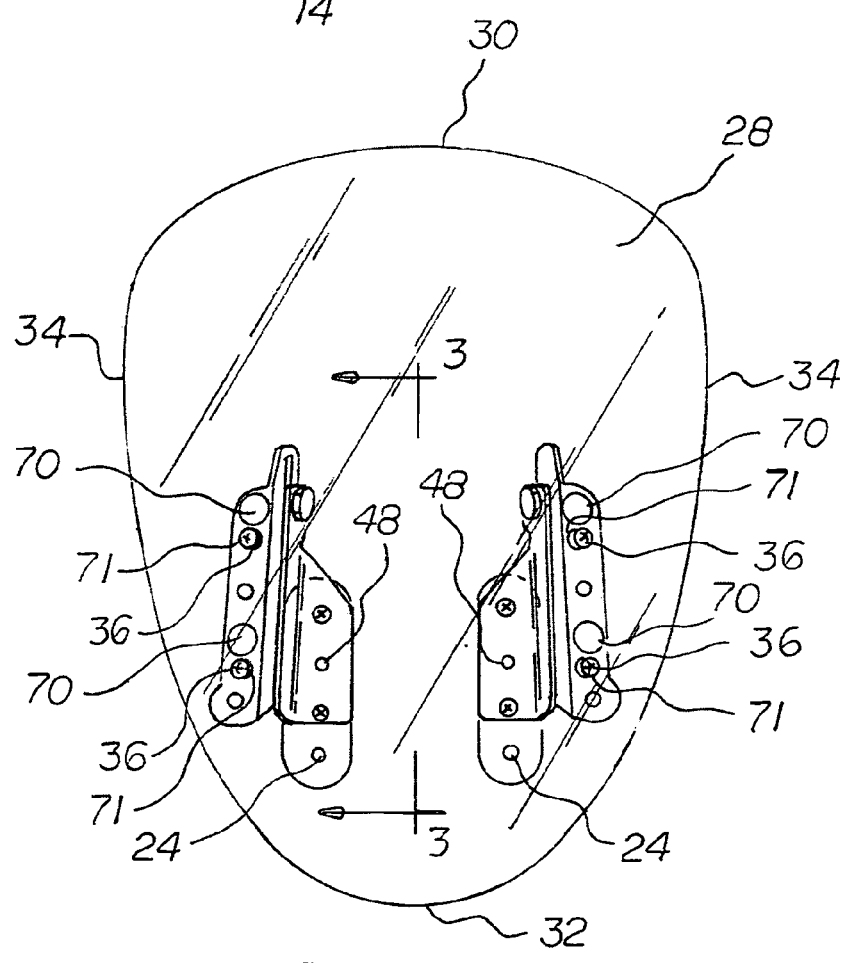
FIG. 2 is a front elevational view of the motorcycle windshield mount system taken at line 2-2 of FIG. 1.
Figure 10:
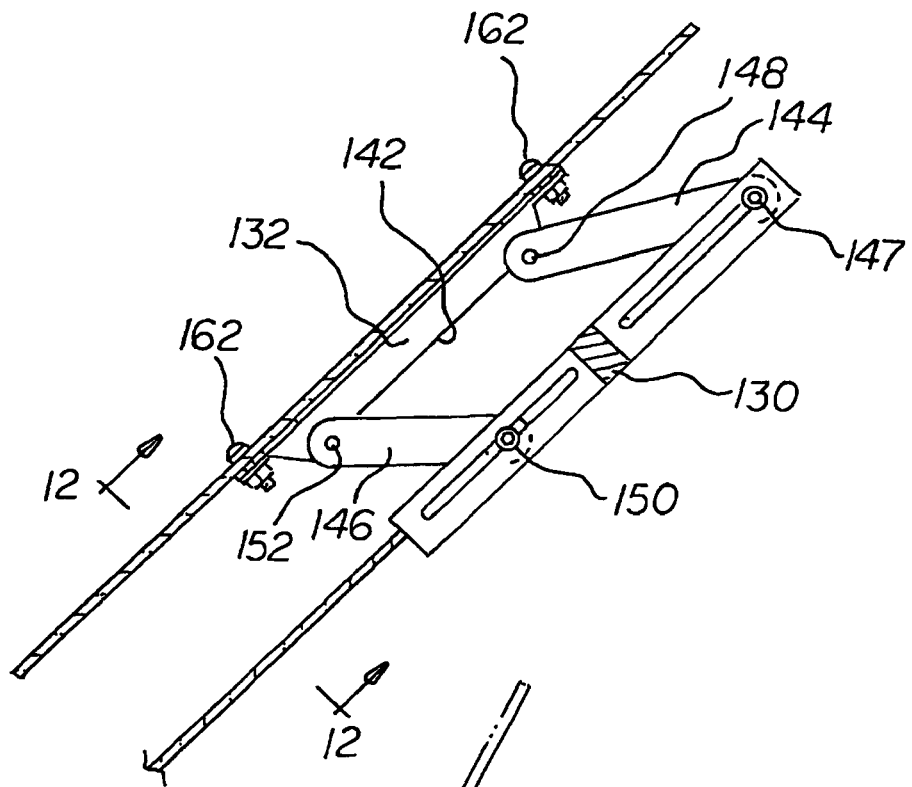
FIG. 10 is a cross sectional view taken along line 10-10 of FIG. 9.
Figure 11:
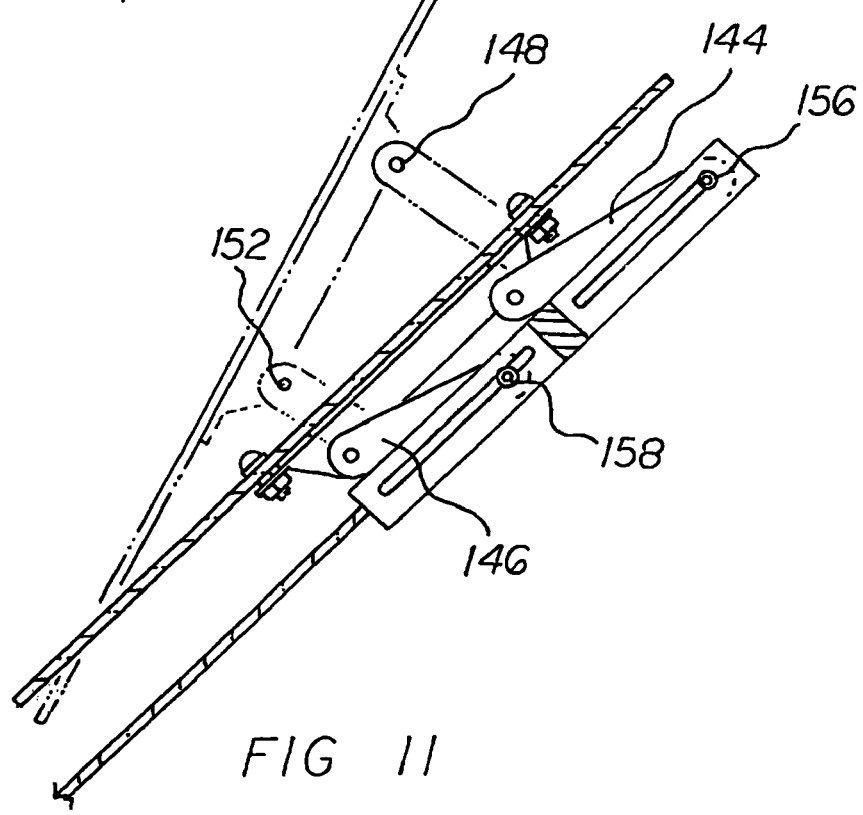
FIG. 11 is a side elevational view similar to FIG. 10 but illustrating alternate orientations.
Figure 12:
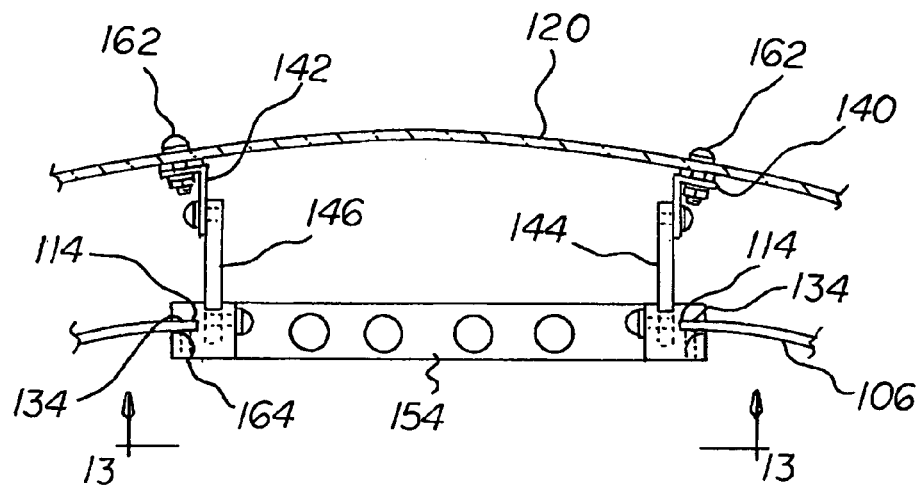
FIG. 12 is a cross sectional view taken along line 12-12 of FIG. 10.
Figure 13:
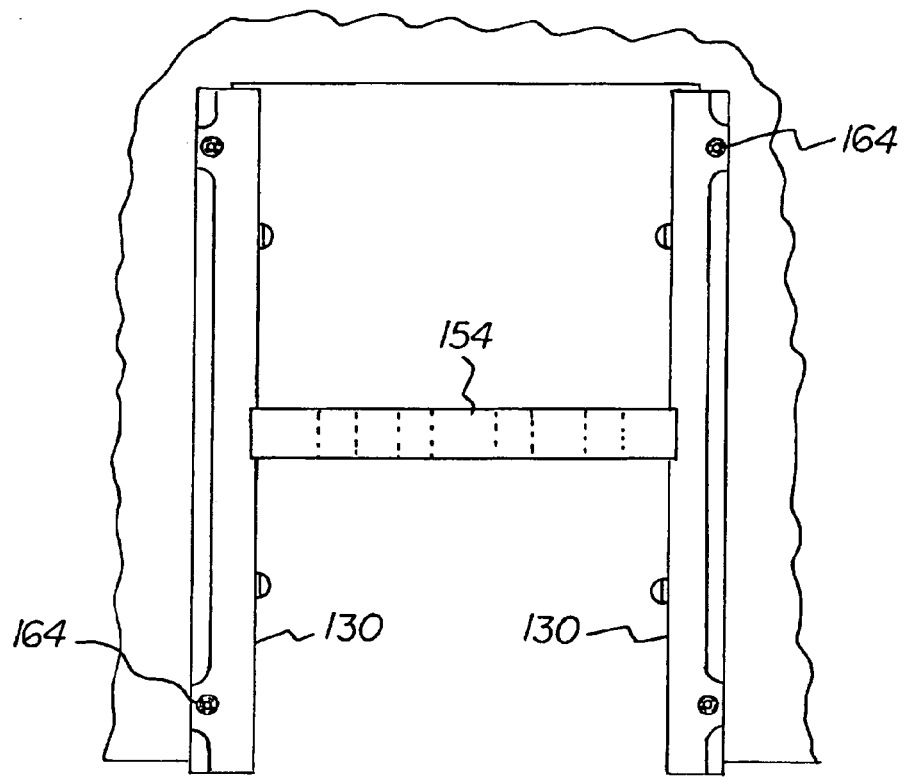
FIG. 13 is a bottom view taken along line 13-13 of FIG. 12.

With reference now to the drawings, and in particular to FIG. 1 thereof, the preferred embodiment of the new and improved motorcycle and windshield mount system embodying the principles and concepts of the present invention and generally designated by the reference numeral 10 will be described.

The present invention, the motorcycle and windshield mount system 10 is comprised of a plurality of components. Such components in their broadest context include two pair of brackets. Such components are individually configured and correlated with respect to each other so as to attain the desired objective.

First provided is a motorcycle 14. The motorcycle has a front 16 and a back 18. The motorcycle has opposite sides 20. A vertical central plane is provided through the motorcycle. The motorcycle has a recipient surface 22. The motorcycle has two rows of four threaded apertures 24. The apertures are aligned parallel with the central plane, equally spaced, and on opposite sides. The recipient surface is in a plane. The plane extends rearwardly at an angle of about 60 degrees from the horizontal.

A windshield 28 is provided. The windshield is fabricated of a transparent, essentially rigid material. The windshield is formed with a top edge 30. The windshield is formed with a bottom edge 32. The windshield is further formed with side edges 34. The windshield has a vertical central plane. The vertical central plane is coextensive with the central plane of the motorcycle. The windshield is essentially in a plane. The windshield has two rows of two apertures 36. The apertures are aligned parallel with the central plane, equally spaced, and on opposite sides. The apertures of the windshield are wider spaced than the apertures of the motorcycle.

Further provided are two pair of brackets 40. Each pair of brackets has a bottom bracket 42 and a top bracket 44. Each bottom bracket has a lower section 46. The lower section is positioned on the recipient surface. Three holes 48 are provided in the lower section. The holes are positionable over appropriate threaded apertures of the recipient surface for adjustment front and back. Note FIGS. 6 and 7. Each bottom bracket has an upper section 50. The upper section has a circular hole 52. The circular hole is provided forwardly. The upper section has an arcuate slot 54. The arcuate slot is provided rearwardly. The arcuate slot has a center of curvature at the center of the circular hole. The arcuate slot spans the plane of the recipient surface.

Each top bracket has an upper section 56. The upper section is positioned in contact with the windshield. The upper section has five holes 58. The five holes extend through the upper section. The five holes are positionable over the apertures of the windshield. Each top bracket has a lower section 60. The lower section is formed with two linear slots. The linear slots include an upper rearward slot 62 and a lower forward slot 64. The slots are provided parallel with each other and at an angle of about 15 degrees with respect to the plane of the windshield. The upper sections of the bottom brackets and the lower sections of the top brackets are slidable with respect to each other and are at outward angles of about 70 degrees from the planes of the recipient surface and the windshield.

Provided last are two pair of primary threaded fasteners 68. The primary threaded fasteners couple the lower sections of the bottom brackets to the motorcycle. Two pair of secondary threaded fasteners 70 are provided. Elastomeric inserts 71 fill unused holes. The secondary threaded fasteners couple the upper sections of the top brackets to the windshield. A bolt 72 is provided. The bolt has a nut 74. The bolt and nut adjustably couple the circular hole to the lower forward slot. A wing bolt 76 is provided. The wing bolt has a nut 78. The wing bolt and nut adjustably couple the upper rearward slot to the arcuate slot.

In this manner the height of the windshield with respect to a motorcycle may be infinitely adjusted, such adjusting being done separately or simultaneously with adjustment of the angle of the windshield. Further, in this manner the angle of the windshield with respect to a motorcycle may be infinitely adjusted, such adjusting being done separately or simultaneously with adjustment of the height of the windshield.

The primary embodiment of the motorcycle secondary windshield mount system 100 of the present invention is shown in FIGS. 8 through 13. The system is for independently and infinitely adjusting the height and angle and separation of a secondary windshield with respect to a primary windshield of a motorcycle.

First provided in the system 100 is a motorcycle 104. The motorcycle has a primary windshield 106 with upper and lower surfaces. The primary windshield has a top 108 and a bottom 110 and tapering opposite sides 112. The distance between the opposite sides is greater adjacent to the top than the bottom. A rectangular cutout in the primary windshield extends downwardly from the top to form parallel side edges 114 of a length defining a height and a transverse lower edge 116 of a length defining a width.

Next provided is a secondary windshield 120 having upper and lower surfaces and having a top 122 and a bottom 124 and tapering opposite sides 126. The distance between the opposite sides of the secondary windshield is greater adjacent to the top than the bottom. The distance between the opposite sides of the secondary windshield is greater than the width of the cutout but less than the width of the primary windshield. The distance between the top and bottom of the secondary windshield is greater than the height of the cutout but less than the height of the primary windshield. The windshields are fabricated of an essentially rigid, transparent material.

Next provided are two pair of brackets, a bottom bracket 130 and a top bracket 132 in each pair. Each bottom bracket has a recess 134 to receive an associated side edge of the cutout. Each bottom bracket has upper and lower slots 136, 138 aligned with a plane of the primary windshield. Each top bracket has a first section 140 positioned in contact with the secondary windshield. Each top bracket has a second section 142 transverse to the first section. Each pair of brackets has an upper leg 144 and a lower leg 146. Each upper leg has a lower end 147 slidable and pivotable within the upper slot. Each upper leg has an upper end 148 pivotable in the second section adjacent the top of the secondary windshield. Each lower leg has a lower end 150 slidable and pivotable within the lower slot. Each lower leg has an upper end 152 pivotable in the second section adjacent the bottom of the secondary windshield. A cross piece 154 couples the brackets to secure the brackets in position within the cutout. Adjustment screws 156, 158 are provided for positioning the legs in an intended orientation. The angle between the legs and the primary windshield determines the separation between the windshields. The spacing between the adjustment screws determines the angle between the windshields. The location of the adjustment screws along the slots determines the height of the secondary windshield.

Lastly, bolts 162 are provided which extend through the first section of each top bracket and the secondary windshield for coupling the top brackets to the secondary windshield. Set screws 164 through each bottom bracket are for coupling the bottom brackets to the primary windshield.

Figure 14:
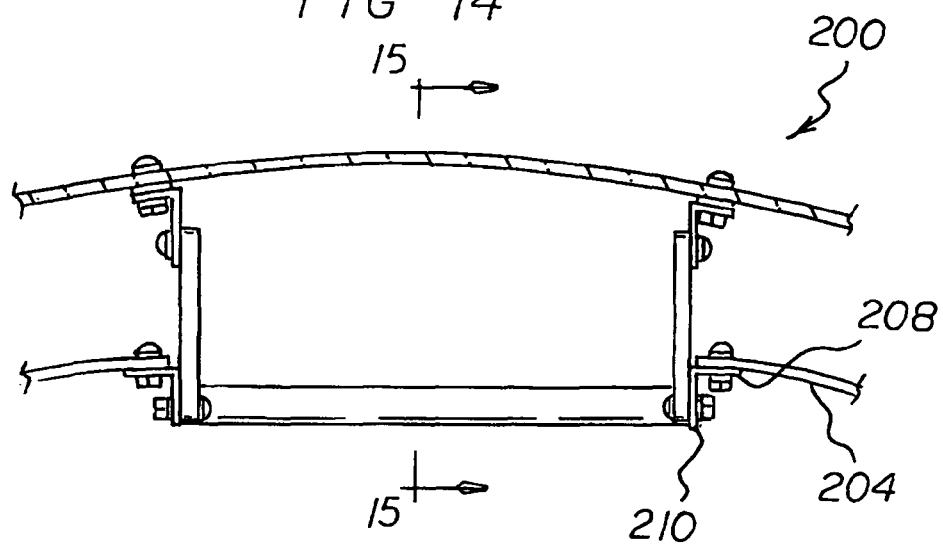
FIG. 14 is a cross sectional view similar to FIG. 12 but illustrating an alternate embodiment of the invention.
Figure 15:
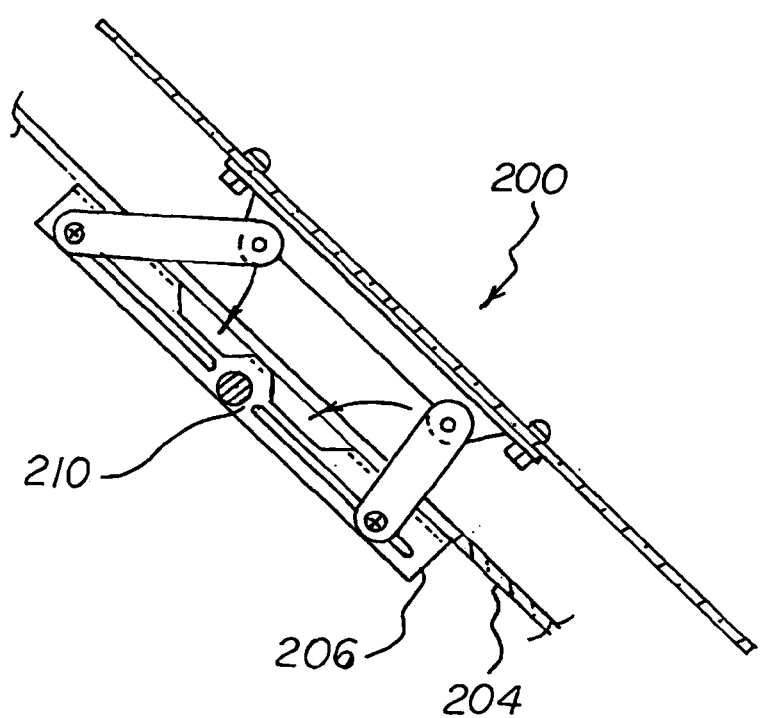
FIG. 15 is a cross sectional view taken along line 15-15 of FIG. 14.

An alternate embodiment of the invention is shown in FIGS. 14 and 15. In this embodiment, the system 200 further includes a primary windshield 204 formed with a cutout. The cutout is formed with side edges and a transverse edge. In this embodiment, each lower bracket 206 is formed with a first part 208 positionable in contact with the primary windshield and a second part 210 transverse to the first part and the slots are formed in the second part.

A final alternate embodiment of the invention is shown in FIGS. 16, 17 and 18. In this embodiment, the system 300 includes a primary windshield 304 formed with a cutout formed with side edges and a transverse edge. In this embodiment each lower bracket 306 is formed with a recess 308 positionable to receive a side edge of the cutout. Each lower bracket also has a forward slot 310 with a reciprocable forward nut 312 and a rearward slot 314 with a reciprocable rearward nut 316. The lower end of the upper leg is pivotably coupled to the forward nut. The lower end of the lower leg is pivotably coupled to the rearward nut. Jack screws 318, 320 with thumb bolts 322, 324 are provided for selectively moving the nuts and the lower ends of the legs.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A motorcycle secondary windshield mount system comprising:
    a secondary windshield having upper and lower surfaces and having a top and a bottom and opposite sides; and
    two pair of brackets, each pair of brackets having a bottom and a top bracket, each bottom bracket having upper and lower slots alignable with a plane of a primary windshield, each top bracket having a first section positioned in contact with the secondary windshield and a second section transverse to the first section, each pair of brackets having upper and lower legs, each upper leg having a lower end slidable and pivotable within the upper slot, each upper leg having an upper end pivotable in the second section adjacent the top of the secondary windshield, each lower leg having a lower end slidable and pivotable within the lower slot, each lower leg having an upper end pivotable in the second section adjacent the bottom of the secondary windshield.

2. The system as set forth in claim 1 and further including a primary windshield formed with a cutout, the cutout being formed with side edges and a transverse edge, and wherein each lower bracket is formed with a recess adapted to receive a side edge of the cutout.

3. The system as set forth in claim 1 and further including a primary windshield formed with a cutout, the cutout being formed with side edges and a transverse edge, and wherein each lower bracket is formed with a first part positionable in contact with the primary windshield and a second part transverse to the first part, the slots being formed in the second part.

4. The system as set forth in claim 1 and further including a primary windshield formed with a cutout, the cutout being formed with side edges and a transverse edge, and wherein each lower bracket is formed with a recess positionable to receive a side edge of the cutout, each lower bracket also having a forward slot with a reciprocable forward nut and a rearward slot with a reciprocable rearward nut, the lower end of the upper leg pivotably coupled to the forward nut, the lower end of the lower leg pivotably coupled to the rearward nut, and with jack screws with thumb bolts for selectively moving the nuts and the lower ends of the legs.

5. A motorcycle secondary windshield mount system for independently and infinitely adjusting the height and angle and separation of a secondary windshield with respect to a primary windshield of a motorcycle, the system comprising, in combination:
    a motorcycle having a primary windshield with upper and lower surfaces and a top and a bottom and tapering opposite sides, the distance between the opposite sides being greater adjacent to the top than the bottom, a rectangular cutout in the primary windshield extending downwardly from the top to form parallel side edges of a length defining a height and a transverse lower edge of a length defining a width;
    a secondary windshield having upper and lower surfaces and a top and a bottom and tapering opposite sides, the distance between the opposite sides of the secondary windshield being greater adjacent to the top than the bottom, the distance between the opposite sides of the secondary windshield being greater than the width of the cutout but less than the width of the primary windshield, the distance between the top and bottom of the secondary windshield being greater than the height of the cutout but less than the height of the primary windshield, the windshields being fabricated of an essentially rigid, transparent material;
    two pair of brackets, each pair of brackets having a bottom bracket and a top bracket, each bottom bracket having a recess to receive an associated side edge of the cutout, each bottom bracket having upper and lower slots aligned with a plane of the primary windshield, each top bracket having a first section positioned in contact with the secondary windshield, each top bracket having a second section transverse to the first section, each pair of brackets having an upper leg and a lower leg, each upper leg having a lower end slidable and pivotable within the upper slot, each upper leg having an upper end pivotable in the second section adjacent the top of the secondary windshield, each lower leg having a lower end slidable and pivotable within the lower slot, each lower leg having an upper end pivotable in the second section adjacent the bottom of the secondary windshield, a cross piece coupling the brackets to secure the brackets in position within the cutout, adjustment screws for positioning the legs in an intended orientation, the angle between the legs and the primary windshield determining the separation between the windshields, the spacing between the adjustment screws determining the angle between the windshields, the location of the adjustment screws along the slots determining the height of the secondary windshield; and
    bolts extending through the first section of each top bracket and the secondary windshield for coupling the top brackets to the secondary windshield, set screws through each bottom bracket for coupling the bottom brackets to the primary windshield.

* * * * *